(12) United States Patent
Porter et al.

(10) Patent No.: US 10,465,839 B2
(45) Date of Patent: Nov. 5, 2019

(54) REMOTE TOOLLESS MOUNTING ACCESSORY

(71) Applicant: AMX LLC, Richardson, TX (US)

(72) Inventors: Jomichael Porter, Dallas, TX (US); Vincent W. Ellis, Plano, TX (US); Miguel Alejandro Sereno, Murphy, TX (US)

(73) Assignee: HARMAN PROFESSIONAL, INC., Northridge, CA (US)

( * ) Notice: Subject to any disclaimer, the term of this patent is extended or adjusted under 35 U.S.C. 154(b) by 42 days.

(21) Appl. No.: 15/535,040

(22) PCT Filed: Dec. 10, 2015

(86) PCT No.: PCT/US2015/064987
§ 371 (c)(1),
(2) Date: Jun. 10, 2017

(87) PCT Pub. No.: WO2016/094652
PCT Pub. Date: Jun. 16, 2016

(65) Prior Publication Data
US 2017/0363251 A1  Dec. 21, 2017

Related U.S. Application Data

(60) Provisional application No. 62/090,575, filed on Dec. 11, 2014.

(51) Int. Cl.
*F16M 13/02* (2006.01)
*F16M 11/04* (2006.01)
*F16B 1/00* (2006.01)

(52) U.S. Cl.
CPC ............ *F16M 13/02* (2013.01); *F16B 1/00* (2013.01); *F16M 11/041* (2013.01); *F16M 13/022* (2013.01); *F16B 2001/0035* (2013.01); *F16B 2001/0064* (2013.01)

(58) Field of Classification Search
CPC .... F16M 13/02; F16M 11/041; F16M 13/022; F16B 1/00; F16B 2001/0064; F16B 2001/0035
USPC .. 248/683, 467, 537, 205.5, 309.4, 917–924
See application file for complete search history.

(56) References Cited

U.S. PATENT DOCUMENTS

| 6,229,584 | B1 * | 5/2001 | Chuo ................... G06F 1/1601 248/917 |
| 6,232,696 | B1 * | 5/2001 | Kim .................... F04D 25/0653 310/156.37 |
| 7,987,811 | B2 * | 8/2011 | Zhang .................... B05B 13/02 118/500 |
| 8,540,197 | B1 * | 9/2013 | Krol, II .............. A63C 17/0006 211/DIG. 1 |
| 9,397,719 | B1 * | 7/2016 | Schmidt ................. F16M 11/24 |
| 2002/0066845 | A1 | 6/2002 | Pitlor |
| 2003/0227389 | A1 * | 12/2003 | McGreal ................ G08B 17/10 340/628 |

(Continued)

*Primary Examiner* — Muhammad Ijaz

(57) ABSTRACT

Mounting a device to the wall for surveillance or other similar purposes may be performed without permanent screws or other tool-requiring components. One example device may include a mount plate, a number of magnets embedded in the mount plate, and a number of gravity reducing protrusions on the mount plate to provide a resting surface for a device mounted to the mount plate.

9 Claims, 5 Drawing Sheets

(56) References Cited

U.S. PATENT DOCUMENTS

| | | | | |
|---|---|---|---|---|
| 2004/0232291 | A1* | 11/2004 | Carnevali | F16M 13/00 |
| | | | | 248/206.5 |
| 2011/0011994 | A1* | 1/2011 | Ahlstrom | A47G 1/168 |
| | | | | 248/205.4 |
| 2013/0303000 | A1* | 11/2013 | Witter | H01R 13/6205 |
| | | | | 439/39 |
| 2014/0120746 | A1* | 5/2014 | Persion | G02B 6/3817 |
| | | | | 439/39 |
| 2014/0157641 | A1* | 6/2014 | Tucker | F41A 23/18 |
| | | | | 42/94 |
| 2014/0263908 | A1* | 9/2014 | Franklin | F16M 13/02 |
| | | | | 248/309.4 |
| 2015/0128491 | A1* | 5/2015 | Aller | A01G 9/022 |
| | | | | 47/65.5 |
| 2015/0377578 | A1* | 12/2015 | Tucker | F41A 23/18 |
| | | | | 248/309.4 |
| 2016/0003270 | A1* | 1/2016 | Franklin | F16B 1/00 |
| | | | | 439/529 |
| 2016/0069510 | A1* | 3/2016 | Chen | F16M 13/022 |
| | | | | 248/206.5 |
| 2017/0246488 | A1* | 8/2017 | Moscherosch | A62C 13/78 |
| 2017/0363251 | A1* | 12/2017 | Porter | F16M 11/041 |
| 2019/0177983 | A1* | 6/2019 | Klein | E04F 13/0883 |

* cited by examiner

REMOTE TOOLLESS MOUNTING ACCESSORY

CROSS-REFERENCE TO RELATED APPLICATIONS

This application claims priority to earlier filed provisional application No. 62/090,575 entitled "REMOTE TOOLLESS MOUNTING ACCESSORY", filed on Dec. 11, 2014, the entire contents of which are hereby incorporated by reference herein.

TECHNICAL FIELD

This application relates to an apparatus for mounting devices to a wall or more particularly to a mount that provides a removable mounting surface which can be used without tools and without a permanent attachment to the device to be mounted.

BACKGROUND

Conventionally, a camera, sensor or other electronic device may be permanently affixed to a wall mount to provide a strategic angle for capturing video, sensory feedback or other information. In general, wall mounts are not as expensive as cameras and other devices, which reside on the surface of the mount. Also, the desire to monitor and utilize such monitoring devices in varying locations requires flexibility to remove the device from one mount to another mount without arduous removal requirements or certain hand tools.

SUMMARY

One embodiment may include an apparatus that includes a mount plate with a front side and a rear side, a number of magnets embedded in the mount plate, and a number of gravity reducing protrusions on the front side of the mount plate to provide a resting surface for a device mounted to the mount plate.

Another embodiment may include an apparatus that includes a mount plate a plurality of magnets embedded in the mount plate, and a plurality of gravity reducing protrusions on the mount plate to provide a resting surface for a device mounted to the mount plate, wherein the device comprises a mounting plate that is magnetically affixed to the mount plate via the plurality of magnets embedded in the mount plate.

DETAILED DESCRIPTION

It will be readily understood that the components of the present application, as generally described and illustrated in the figures herein, may be arranged and designed in a wide variety of different configurations. Thus, the following detailed description of the embodiments of an apparatus, and system configuration, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
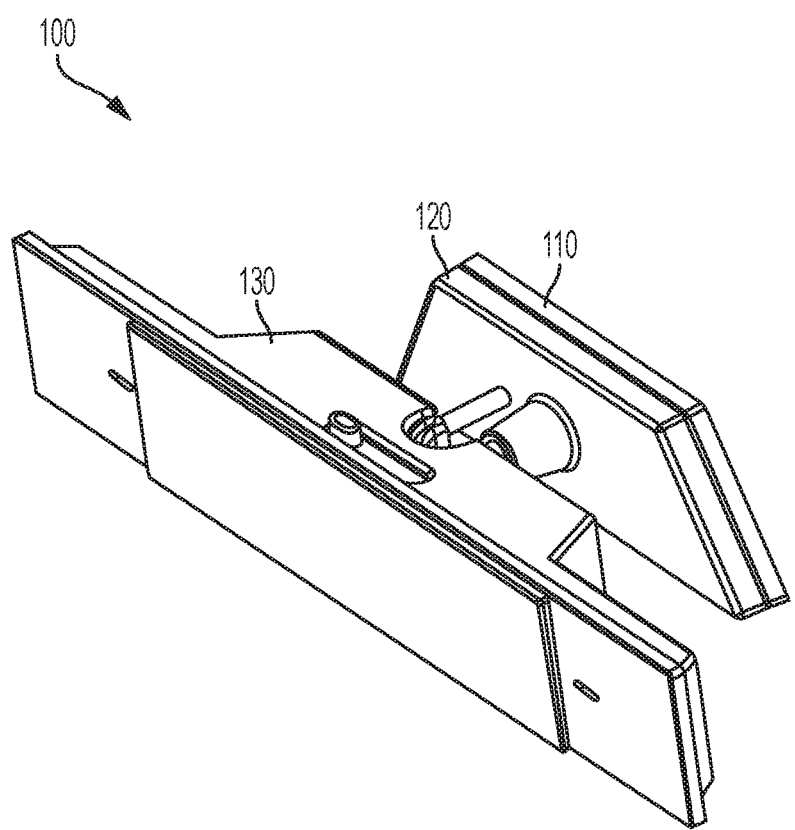
FIG. 1 illustrates a wall mount and corresponding device configuration according to example embodiments.

FIG. 1 illustrates a wall mount and corresponding device configuration 100 according to example embodiments. Referring to FIG. 1, the device 130 may be a sensor housing, a camera, a video recording device, etc. The device has a mounting portion or 'mounting plate' 120, which is approximately the same size as the wall 'mount plate' 110. The device 130 and the mounting portion 120 may be readily placed and removed from the mount plate via a securing magnet that holds the device against the mount plate 110.

Figure 2:
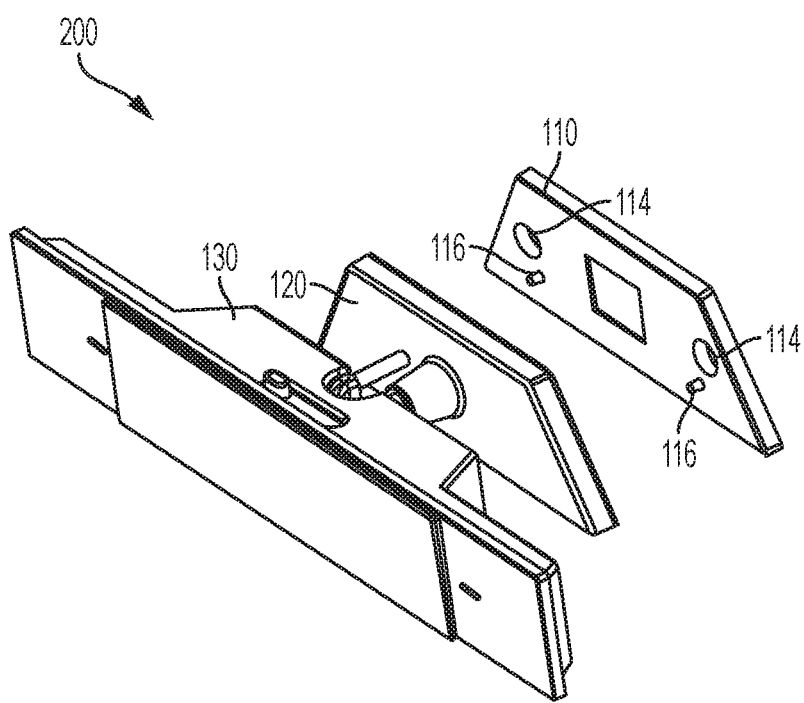
FIG. 2 illustrates an exploded view of the wall mount and corresponding device configuration according to example embodiments.

FIG. 2 illustrates an exploded view of the wall mount and corresponding device configuration according to example embodiments. Referring to FIG. 2, the exploded view demonstrates details of the mount plate 110 with a set of screw holes 114. In this example, the mount plate 110 has a pair of holes 114 which may be used to mount the mount plate to a wall via screws or other affixing elements. Also, inside the body of the planar surface of the wall plate 110 may include a pair or series of single or double sided magnets which can hold the mount plate to the wall via a magnetic force and hold the device 130 and device mounting plate 120 to the mounting plate 110. A pair of gravity reducing support tabs 116 may also offer the mounting plate 120 a male-to-female coupling to reduce the amount of gravity pulling against the weight of the device 130 in a mounted position. The male couplings 116 are illustrated on the mount plate 110 and the female couplings are on the mounting plate 120 (not shown).

Figure 3:
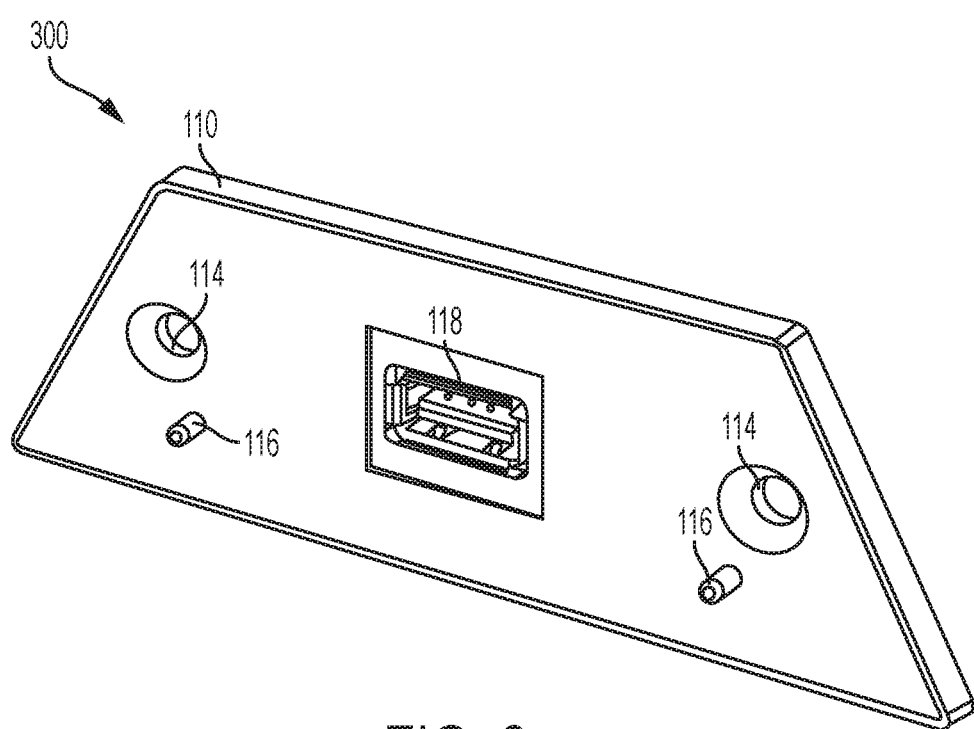
FIG. 3 illustrates a front view of the mount plate with an electronic device interface according to example embodiments.

FIG. 3 illustrates a front view of the mount plate with an electronic device interface according to example embodiments. Referring to FIG. 3, the mount plate in this embodiment has a cable coupling interface 118 that is embedded in the body of the mount plate 110. The interface could be any standard IEEE type cable interface, such as IEEE 1394 FIRE WIRE, USB, HDMI, ETHERNET, fiber optic cable, Coaxial, RCA or any other type of interface that provides communication and/or power to the attached device (not shown).

Figure 4:
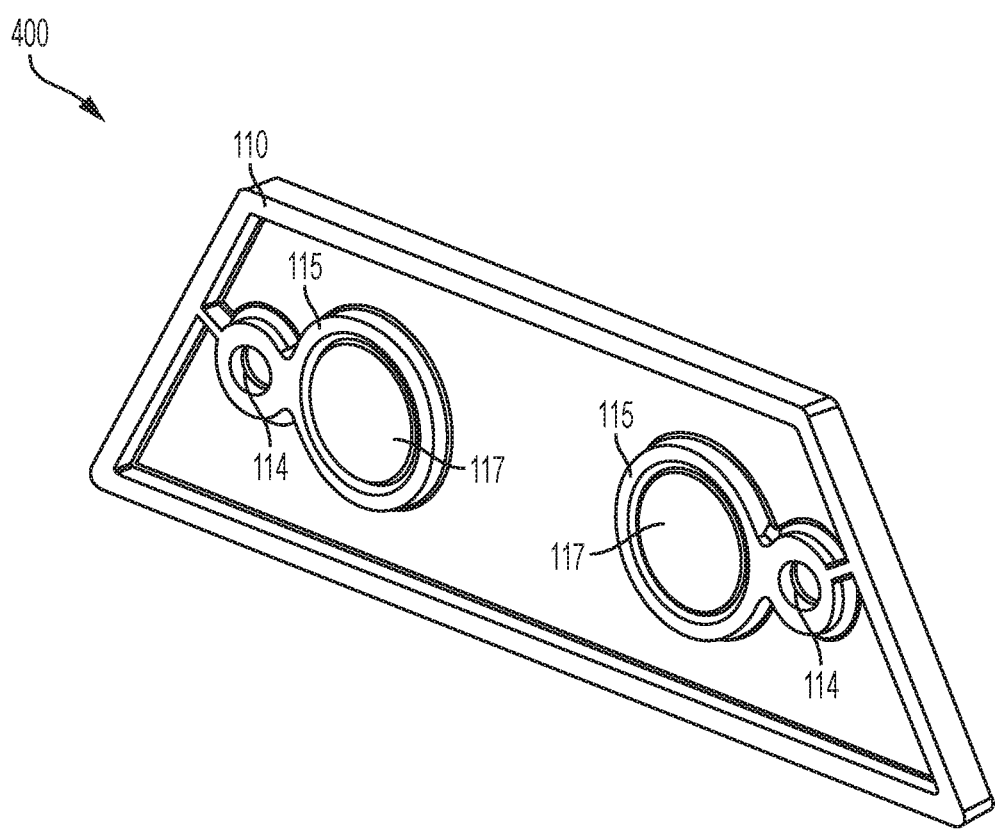
FIG. 4 illustrates a reverse view of the mount plate according to example embodiments.

FIG. 4 illustrates a reverse view of the mount plate according to example embodiments. Referring to FIG. 4, the mount plate 110 may have a plurality of magnets 117 embedded inside the mount plate 110. The number of magnets may vary as appreciated by one skilled in the art, however, in this example there are two circular magnets mounted inside a circular magnet housing 115. The housing may be smaller than the depth of the mount plate which is approximately 10 mm to 100 mm. The magnets are approximately one-inch in diameter and may be smaller or larger depending on the size of the mounting plate 110 and the weight of the device to be mounted. The magnets may be double-sided magnets with magnetic capabilities for mounting onto a metal wall surface and for receiving another magnet or a metal surface of a mounting plate.

Figure 5:
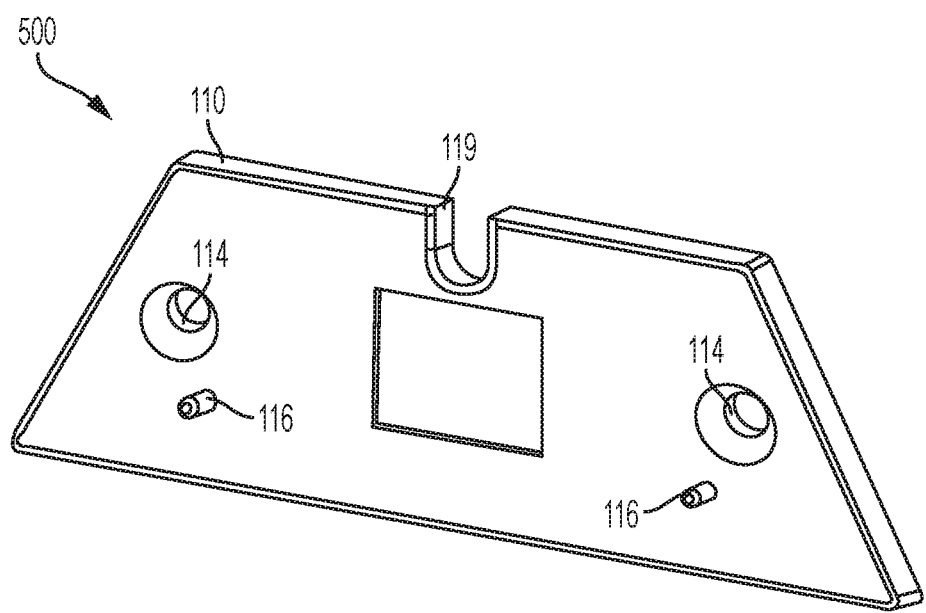
FIG. 5 illustrates a front view of an alternative embodiment mount plate with a cable access slot according to example embodiments.

FIG. 5 illustrates a front view of an alternative embodiment mount plate with a cable access slot according to example embodiments. Referring to FIG. 5, the mount plate 110 may have a curved notch 119 which provides a passage for a cable or other wire. According to certain example embodiments, the mount plate 110 does not need to be screwed into a wall because of magnets on the back side of the mount plate 110. In an alternate embodiment, the magnets may be positioned on the front side of the mount plate 110 (not shown). However, the holes 114 could be used for screwing a screw through the plate into the wall if deemed necessary or if no magnetic surface is available to receive the magnets of the mount plate 110. The exposed magnets on the back will permit the plate to mount to a ferrous metal surface. For installations on other surfaces, screws and drywall anchors could also be used for the holes 114. Also, adhesive could be used to mount the plate 110 to a glass or stone surface that the user would not want to create holes to engage the mount plate 110. Additionally, double-sided magnets could be placed on the wall plate to attract the device for securing measures magnetically and holding it to the wall. The magnets are exposed on the back side to provide maximum attraction to the metal mounting surface. The front side of the mount plate 110 has a thin layer of plastic separating the magnets from the steel base of the camera or whatever device desired to be mounted on the front of mount plate.

According to example embodiments, a series of mount plates 110 would be mounted in a variety of locations and a single device with a mounting plate 120 affixed thereto could be placed and removed with relative ease. For example, a user may want to monitor activity in the home office, bedroom, garage, backyard, front yard, etc., and the mount plates may be pre-installed and may provide a way to receive the device and hold it magnetically until the user decides to remove the device with a small level of force and mount it on another different mount plate in another location.

It will be readily understood that the components of the embodiments, as generally described and illustrated in the figures herein, may be arranged and designed in a wide variety of different configurations. Thus, the detailed description of the embodiments is not intended to limit the scope of the embodiments as claimed, but is merely representative of selected embodiments.

Therefore, although the embodiments have been described based upon these preferred embodiments, it would be apparent to those of skill in the art that certain modifications, variations, and alternative constructions would be apparent, while remaining within the spirit and scope of the embodiments. In order to determine the metes and bounds of the embodiments, therefore, reference should be made to the appended claims.

What is claimed is:

1. An apparatus comprising:
    a mount plate with a front side configured to attach to a corresponding mounting plate of a device and a rear side configured to attach to a surface, wherein the mount plate comprises a slot that includes an electronic interface;
    a plurality of magnets embedded in the mount plate that are configured to magnetically affix the corresponding mounting plate of the device to the mount plate based on magnets within the corresponding mounting plate of the device; and
    a plurality of protrusions on the front side of the mount plate which extend in a perpendicular direction from the front side and which are configured to mate with holes in the corresponding mounting plate thereby providing a resting surface on top of the protrusions that reduces a force of gravity pulling the device downward when the corresponding mounting plate is magnetically affixed to the front side of the mount plate.

2. The apparatus of claim 1, wherein the mounting plate of the device comprises a same size and shape as the mount plate of the apparatus.

3. The apparatus of claim 2, wherein the plurality of magnets embedded in the mount plate comprise double sided magnets that are further configured to magnetically affix the rear side of the mount plate to the surface.

4. The apparatus of claim 1, wherein the plurality of magnets comprises at least two circular magnets.

5. The apparatus of claim 4, wherein the at least two circular magnets are double sided magnets.

6. The apparatus of claim 1, wherein the mount plate is made of plastic.

7. The apparatus of claim 1, wherein the mount plate is made of metal.

8. The apparatus of claim 1, wherein the electronic interface comprises at least one of IEEE 1394 FIRE WIRE, USB, HDMI, ETHERNET, fiber optic cable, Coaxial, and RCA.

9. An apparatus comprising:
    a mount plate with a front side configured to attach to a corresponding mounting plate of a device and a rear side configured to attach to a surface;
    a plurality of magnets embedded in the mount plate that are configured to magnetically affix the corresponding mounting plate of the device to the mount plate based on magnets within the corresponding mounting plate of the device; and
    a plurality of protrusions on the front side of the mount plate which extend in a perpendicular direction from the front side and which are configured to mate with holes in the corresponding mounting plate thereby providing a resting surface on top of the protrusions that reduces a force of gravity pulling the device downward when the corresponding mounting plate is magnetically affixed to the front side of the mount plate,
    wherein the mount plate further comprises a plurality of screw holes to affix the mount plate to the surface via screws, and the plurality of protrusions are positioned below the plurality of screw holes.

* * * * *